United States Patent
Priban

(10) Patent No.: US 8,451,586 B2
(45) Date of Patent: May 28, 2013

(54) SEALING ASSEMBLY FOR A WET ELECTROLYTIC CAPACITOR

(75) Inventor: Frantisek Priban, Zabreh (CZ)

(73) Assignee: AVX Corporation, Fountain Inn, SC (US)

( * ) Notice: Subject to any disclaimer, the term of this patent is extended or adjusted under 35 U.S.C. 154(b) by 111 days.

(21) Appl. No.: 13/231,132

(22) Filed: Sep. 13, 2011

(65) Prior Publication Data

US 2013/0063869 A1    Mar. 14, 2013

(51) Int. Cl.
*H01G 9/04*    (2006.01)

(52) U.S. Cl.
USPC ........... 361/508; 361/509; 361/517; 361/518; 361/535; 361/536

(58) Field of Classification Search
USPC ............. 361/508, 509, 517–519, 523–529, 361/535, 536, 537, 538
See application file for complete search history.

(56) References Cited

U.S. PATENT DOCUMENTS

| | | | |
|---|---|---|---|
| 3,742,584 A | 7/1973 | Marcoux et al. | |
| 3,809,552 A | 5/1974 | Klein | |
| 3,912,985 A | 10/1975 | Sawchuk | |
| 3,956,819 A | 5/1976 | Augeri | |
| 4,025,827 A | 5/1977 | Pellerin et al. | |
| 4,296,458 A | 10/1981 | Smith et al. | |
| 4,479,168 A | 10/1984 | Green, Jr. | |
| 4,538,212 A | 8/1985 | Montgomery | |
| 4,780,797 A | 10/1988 | Libby | |
| 4,987,519 A | 1/1991 | Hutchins et al. | |
| 4,992,910 A | 2/1991 | Evans | |
| 5,105,341 A | 4/1992 | Stephenson et al. | |
| 5,369,547 A | 11/1994 | Evans | |
| 5,400,211 A | 3/1995 | Evans | |
| 5,456,878 A | 10/1995 | Tadokoro et al. | |
| 5,559,667 A | 9/1996 | Evans | |
| 5,737,181 A | 4/1998 | Evans | |
| 5,754,394 A | 5/1998 | Evans et al. | |
| 5,786,980 A | 7/1998 | Evans | |
| 5,808,858 A * | 9/1998 | Vetter | 361/519 |
| 5,926,362 A | 7/1999 | Muffoletto et al. | |
| 6,008,980 A | 12/1999 | Stevenson et al. | |
| 6,064,563 A * | 5/2000 | Yamada et al. | 361/521 |
| 6,208,502 B1 | 3/2001 | Hudis et al. | |
| 6,231,993 B1 | 5/2001 | Stephenson et al. | |
| 6,334,879 B1 | 1/2002 | Muffoletto et al. | |
| 6,385,490 B1 | 5/2002 | O'Phelan et al. | |
| 6,445,567 B1 * | 9/2002 | Komatsuki et al. | 361/518 |

(Continued)

OTHER PUBLICATIONS

Paper—Wet Electrolyte Tantalum Capacitors from Vishay, Sep. 1, 2003, 4 pages, www.vishay.com.

(Continued)

*Primary Examiner* — Nguyen T Ha
(74) *Attorney, Agent, or Firm* — Dority & Manning, P.A.

(57) ABSTRACT

A wet electrolytic capacitor that contains an anode and a fluid electrolyte that are positioned within a casing is provided. The capacitor also contains a sealing assembly that employs a bushing having opposing inwardly facing, tapered surfaces between which an orifice is defined. To help inhibit leakage from the orifice, a liquid sealing member is also employed that contains a protrusion having outwardly facing, tapered surfaces that are configured to mate with the inwardly facing surfaces of the bushing. At least one outwardly facing surface of the sealing member is tapered at an angle greater than a respective inwardly facing surface of the bushing.

31 Claims, 6 Drawing Sheets

U.S. PATENT DOCUMENTS

| | | | |
|---|---|---|---|
| 6,535,374 B2 * | 3/2003 | O'Phelan et al. | 361/512 |
| 6,576,524 B1 | 6/2003 | Evans et al. | |
| 6,594,140 B1 | 7/2003 | Evans et al. | |
| 6,613,474 B2 | 9/2003 | Frustaci et al. | |
| 6,721,170 B1 | 4/2004 | Evans et al. | |
| 6,801,424 B1 | 10/2004 | Nielsen et al. | |
| 6,805,777 B1 | 10/2004 | D'Astolfo, Jr. | |
| 6,807,048 B1 | 10/2004 | Nielsen et al. | |
| 6,850,405 B1 | 2/2005 | Mieham et al. | |
| 6,952,339 B1 * | 10/2005 | Knowles | 361/528 |
| 7,002,790 B2 | 2/2006 | Hossick-Schott et al. | |
| 7,012,799 B2 | 3/2006 | Muffoletto et al. | |
| 7,072,171 B1 | 7/2006 | Muffoletto et al. | |
| 7,085,126 B2 | 8/2006 | Muffoletto et al. | |
| 7,092,242 B1 | 8/2006 | Gloss et al. | |
| 7,099,143 B1 | 8/2006 | Fife et al. | |
| 7,206,186 B1 | 4/2007 | Knight et al. | |
| 7,256,982 B2 | 8/2007 | Lessner et al. | |
| 7,271,994 B2 | 9/2007 | Stemen et al. | |
| 7,274,551 B1 | 9/2007 | Parler, Jr. et al. | |
| 7,301,754 B1 | 11/2007 | Knowles | |
| 7,342,774 B2 | 3/2008 | Hossick-Schott et al. | |
| 7,375,949 B2 | 5/2008 | Barr et al. | |
| 7,456,073 B2 | 11/2008 | Fife et al. | |
| 7,480,130 B2 | 1/2009 | Fife et al. | |
| 7,511,943 B2 | 3/2009 | Fife et al. | |
| 7,813,107 B1 | 10/2010 | Druding et al. | |
| 7,830,647 B2 * | 11/2010 | Miura et al. | 361/518 |
| 7,837,743 B2 | 11/2010 | Gaffney et al. | |
| 8,259,435 B2 * | 9/2012 | Millman et al. | 361/518 |
| 2009/0193637 A1 | 8/2009 | McCracken et al. | |
| 2010/0067174 A1 | 3/2010 | Ning | |
| 2010/0142124 A1 | 6/2010 | Dreissig et al. | |
| 2010/0238608 A1 | 9/2010 | Dreissig et al. | |
| 2010/0268292 A1 | 10/2010 | Eidelman et al. | |
| 2010/0284124 A1 | 11/2010 | Iyer | |
| 2010/0302709 A1 | 12/2010 | Dreissig et al. | |

OTHER PUBLICATIONS

Paper—Wet Tantalum Capacitors Sintered Anode TANTALEX® Capacitors for Operation to +125 ° C., Elastomer-Sealed from Vishay, Jun. 19, 2007, 5 pages, www.vishay.com.

Paper—Čespiva et al., "Tantalum Hybrid® Capacitors—The Capacitors with the Highest Available Power Density in Medium Voltage Range," Dec. 2009, 15 pages.

Paper—Edson et al., "Electrical Properties of a Novel High CV Wet Tantalum Capacitor'System," CARTS USA Mar. 30-Apr. 2, 2009, Jacksonville, Florida, 11 pages.

Paper—Evans, "High Energy Density Electrolytic-Electrochemical Hybrid Capacitor," Presented to the 14$^{th}$ Capacitor and Resistor Technology Symposium, Mar. 22, 1994, and published in CARTS '94 Proceedings, 6 pages.

Paper—Evans et al., "Performance of Mil-Type Hybrid Tantalum Capacitors," Presented at the 15$^{th}$ Capacitor and Resistor Technology Symposium (CARTS), Mar. 13-16, 1996, 9 pages.

Paper—Freeman et al., "Reliability and Critical Applications of Tantalum Capacitors," 2007 Electronics Components, Assemblies, and Materials Association, Arlington, VA, USA, Proceedings CARTS Europe 2007 Symposium, Oct.-Nov. 2007, Barcelona, Spain, pp. 193-204.

Related Application Form.

Search Report for GB1213207.2 dated Nov. 21, 2012, 3 pages.

* cited by examiner

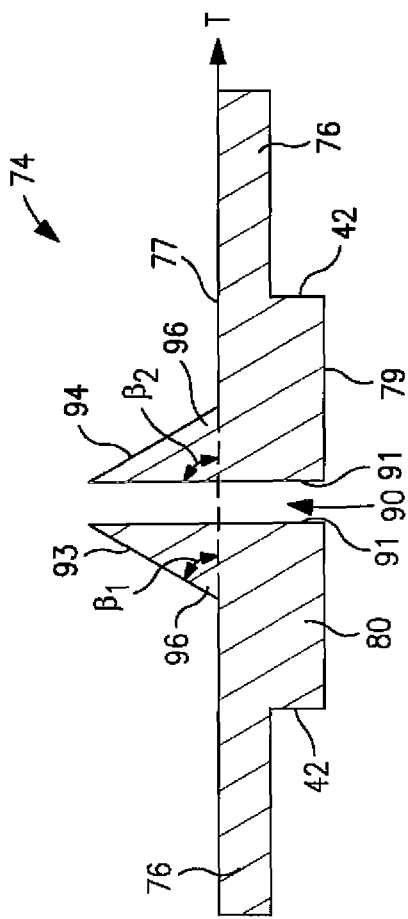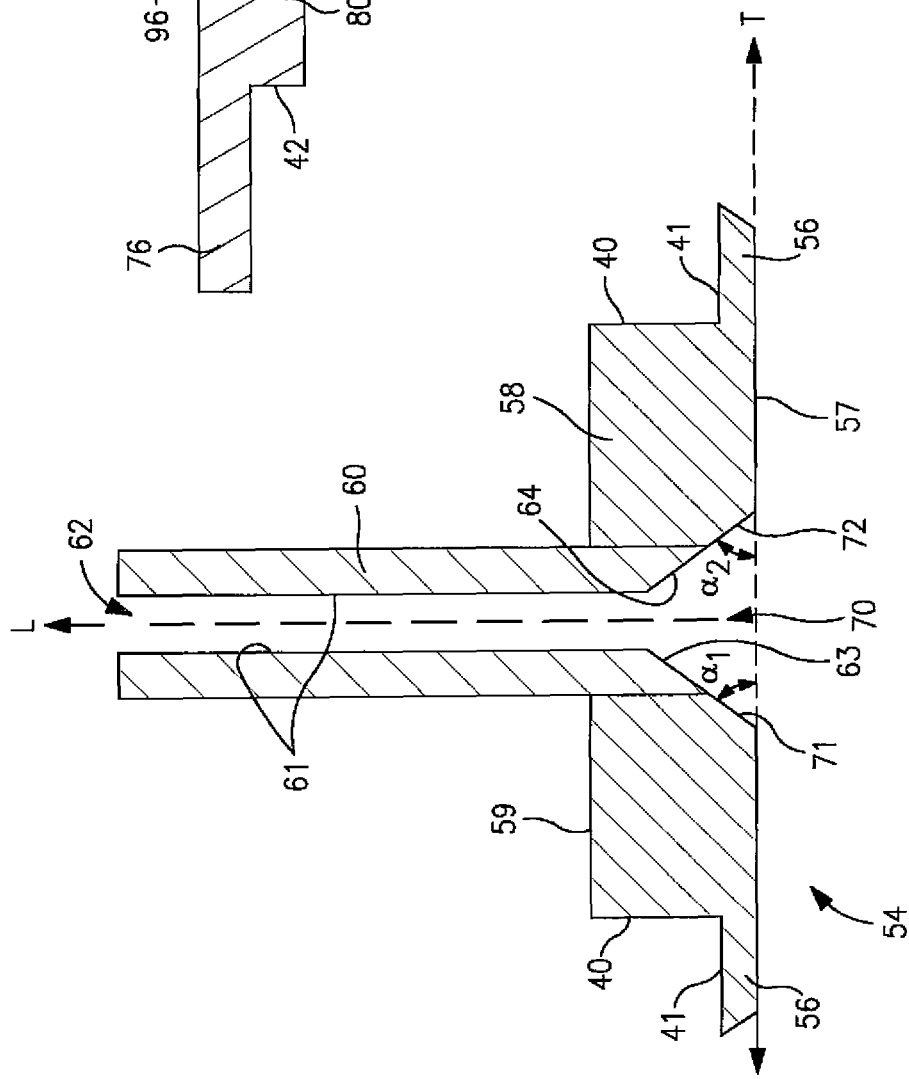

SEALING ASSEMBLY FOR A WET ELECTROLYTIC CAPACITOR

BACKGROUND OF THE INVENTION

Electrolytic capacitors typically have a larger capacitance per unit volume than certain other types of capacitors, making them valuable in relatively high-current and low-frequency electrical circuits. One type of capacitor that has been developed is a "wet" electrolytic capacitor that includes a sintered tantalum powder anode. These tantalum "slugs" have very large internal surface area. These tantalum slugs first undergo an electrochemical oxidation that forms an oxide layer coating acting as dielectric over the entire external and internal surfaces of the tantalum body. The anodized tantalum slugs are then sealed in cans containing a highly conductive and generally corrosive liquid electrolyte solution, having high surface area with conductive linings allowing the flow of the current to the liquid electrolyte solution. Unfortunately, such wet capacitors can experience problems when the liquid electrolyte leaks. For example, gases (e.g., hydrogen) may be evolved during operation, causing pressure to build inside the capacitor. This may cause leaks to occur around conventional non-hermetic polymeric seals, where terminal wires protrude from the capacitor casing.

In light of the above, a gas-tight hermetic seal (e.g., glass-to-metal seal) is often employed through which the terminal wire can safely extend. Still, the hermetic seal itself can sometimes become corroded by the liquid electrolyte. For this reason, a liquid seal is also generally employed to prevent exposure of the inner region of the hermetic seal to the electrolyte. U.S. Pat. No. 7,206,186 to Knight, et al., for instance, describes a liquid seal that is formed by compressing elastomeric rings between the underside of the lid and a terminal plate connected to the capacitor element. A bushing may also be positioned inside the elastomeric rings to center the rings relative to the hermetic seal. Despite attempts at improving the liquid sealing of such electrolytic capacitors, problems nevertheless remain. For example, even when liquid seals are used, a small amount of the electrolyte can sometimes still leak through and cause a high DC leakage current for the resulting capacitor.

As such, a need still exists for an improved hermetically sealed electrolytic capacitor.

SUMMARY OF THE INVENTION

In accordance with one embodiment of the present invention, a wet electrolytic capacitor is disclosed that comprises an anode that comprises a porous anode body coated with a dielectric layer; a fluid electrolyte that is in electrical contact with the anode, wherein an anode lead extends from the porous anode body; a casing within which the anode and the fluid electrolyte are positioned; and a sealing assembly that is connected to the casing and through which the anode lead extends. The sealing assembly comprises a bushing that defines a first orifice between opposing inwardly facing surfaces, at least one of the inwardly facing surfaces being tapered at a first angle. The assembly also comprises a liquid sealing member that is mated with the bushing. The liquid sealing member contains a protrusion having opposing outwardly facing surfaces, at least one of the outwardly facing surfaces being tapered at a second angle that is greater than the first angle. The protrusion is inserted into the orifice so that a seal is capable of being formed between the tapered inwardly facing surface of the bushing and the tapered outwardly facing surface of the liquid sealing member.

Other features and aspects of the present invention are described in more detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 1 is a cross-sectional view of one embodiment of a bushing that may be employed in the sealing assembly of the present invention;

FIG. 2 is a cross-sectional view of one embodiment of a liquid sealing member that may be employed in the sealing assembly of the present invention;

Figure 3:
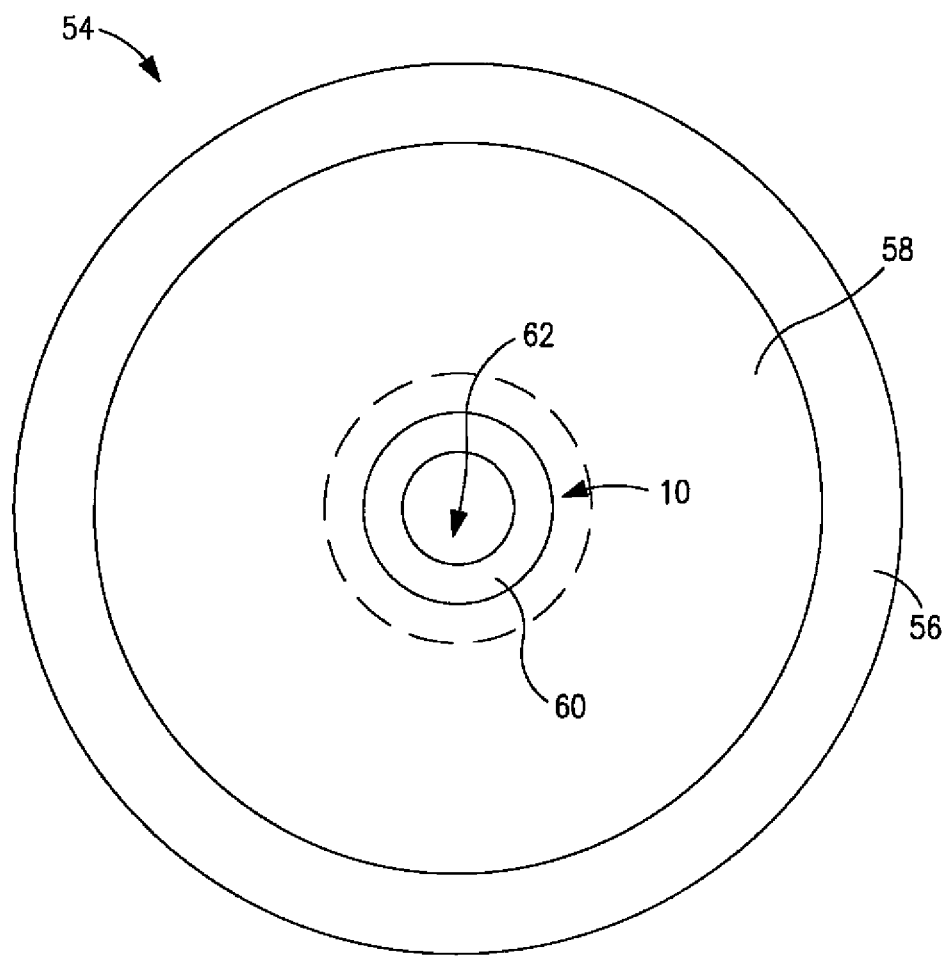
FIG. 3 is a top view of the bushing of FIG. 1.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a wet electrolytic capacitor that contains an anode and a fluid electrolyte that are positioned within a casing. The capacitor also contains a sealing assembly that employs a bushing having opposing inwardly facing, tapered surfaces between which an orifice is defined. The orifice may serve a variety of different purposes, such as receiving a lead from the capacitor anode, providing a location for filling the casing with the fluid electrolyte, etc. To help inhibit leakage from the orifice, a liquid sealing member is also employed that contains a protrusion having outwardly facing, tapered surfaces that are configured to mate with the inwardly facing surfaces of the bushing. Thus, when inserted into the orifice, the liquid sealing member can compress against the bushing before and/or during use to form a seal. Notably, however, the present inventors have discovered that an even more effective seal can be formed by tapering at least one outwardly facing surface of the sealing member at an angle greater than a respective inwardly facing surface of the bushing. In this manner, the surfaces can converge to together to form a tighter wedge than would otherwise be possible if they were merely complementary to each other. This resulting wedge further reduces the likelihood of electrolyte leakage, and in turn, improves the electrical performance of the capacitor.

Referring to FIGS. 1-5, for example, one embodiment of a sealing assembly 50 that employs a bushing 54 and a liquid sealing member 74 will now be described in more detail. As shown in FIGS. 1 and 3, the bushing 54 of this embodiment contains a body portion 58 that extends in a longitudinal direction "L"and defines substantially planar upper and lower surfaces 59 and 57, respectively. A peripheral flange 56 extends outwardly from the body portion 58 in a transverse direction "T" so that the body portion 58 has a width (e.g., diameter) defined between ends 40 that is less than the width of the flange 56. While certainly optional, such a flange may enhance the ability to attach the bushing 54 to other components of the capacitor. As FIG. 3 illustrates, the body portion 58 and the flange 56 may have a generally circular shape. It should be understood, however, that any geometric configuration may be employed for such components, such as D-shaped, rectangular, triangular, prismatic, etc.

To form a hermetic seal, it is typically desired that the body portion 58 and/or the peripheral flange 56 of the bushing 54 are formed from a generally insulative material. For example, the insulative material may have an electrical resistance of about $1 \times 10^2$ ohms-m or more, in some embodiments about $1 \times 10^5$ ohms-m or more, and in some embodiments, from about $1 \times 10^{15}$ to about $1 \times 10^{25}$ ohms-m, determined at a temperature of 20° C. For example, glass materials may be employed as an insulative material, such as glass compositions containing CaO, $Al_2O_3$, $B_2O_3$, SrO, BaO, $LiO_2$, $SiO_2$, $TiO_2$, $Na_2O$, combinations thereof, etc. Barium lanthanboroate glass compositions, which contain boron oxide ($B_2O_3$), barium oxide (BaO), lanthanum oxide ($LiO_2$) and optionally at least one other oxide, are particularly suitable. Such compositions may be described in more detail in U.S. Pat. Nos. 5,648,302 and 5,104,738. Still other insulative materials may include polymer materials, such as fluoropolymers (e.g., polytetrafluoroethylene ("PTFE"), perfluoroalkylvinyl ether ("PVE"), poly(tetrafluoroethylene-co-perfluoroalkyvinyl ether) ("PFA"), fluorinated ethylene-propylene copolymer ("FEP"), ethylene-tetrafluoroethylene copolymer ("ETFE"), polyvinylidene fluoride ("PVDF"), polychlorotrifluoroethylene ("PCTFE"), and TFE copolymers with VF2 and/or HFP, etc.); polyvinyl chloride ("PVC"), polysulfones (e.g., polysulfone, polyethersulfone, etc.); polyimides (e.g., polyetherimide); polyolefins (e.g., polyethylene, polypropylene, etc.); and so forth, as well as mixtures thereof.

Regardless, the body portion 58 of the bushing 54 has opposing inwardly facing surfaces 71 and 72 that define a first orifice 70. The surfaces 71 and/or 72 may be tapered in the sense that they are oriented at angles $\alpha_1$ and $\alpha_2$, respectively, relative to the transverse direction "T." The angles $\alpha_1$ and $\alpha_2$ may be the same or different, but are typically within a range of from about 5° to about 70°, in some embodiments from about 10° to about 65°, in some embodiments from about 20° to about 60°, and in some embodiments, from about 35° to about 55°. The overall size and shape of the orifice 70 is generally sufficient to accommodate the liquid sealing member 74, as will be described more detail below. For example, the tapered surfaces 71 and 72 in the illustrated embodiment form a frustoconically-shaped orifice that has a maximum width at its intersection with the lower surface 57, which gradually decreases as it extends therefrom.

If desired, the sealing assembly 50 may also contain a tubular member 60, which may optionally extend into an upper region of the first orifice 70. The tubular member 60 may be formed integral with or separate from the bushing 54. Among other things, the tubular member 62 may help to protect the anode lead from inadvertent contact with the fluid electrolyte and to ensure a good electrical with the anode termination. In this regard, the tubular member 60 may possess inwardly facing surfaces 61 that define a second orifice 62 of a size and shape sufficient to accommodate the anode lead. The second orifice 62 may have a maximum width (e.g., diameter) that is smaller than the maximum width of the orifice 70. Typically, the surfaces 61 are also substantially parallel so that the second orifice 62 has a cylindrical shape and a generally constant width. The tubular member 60 may be formed from a conductive material, such as a metal, e.g., tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth.

Figure 7:
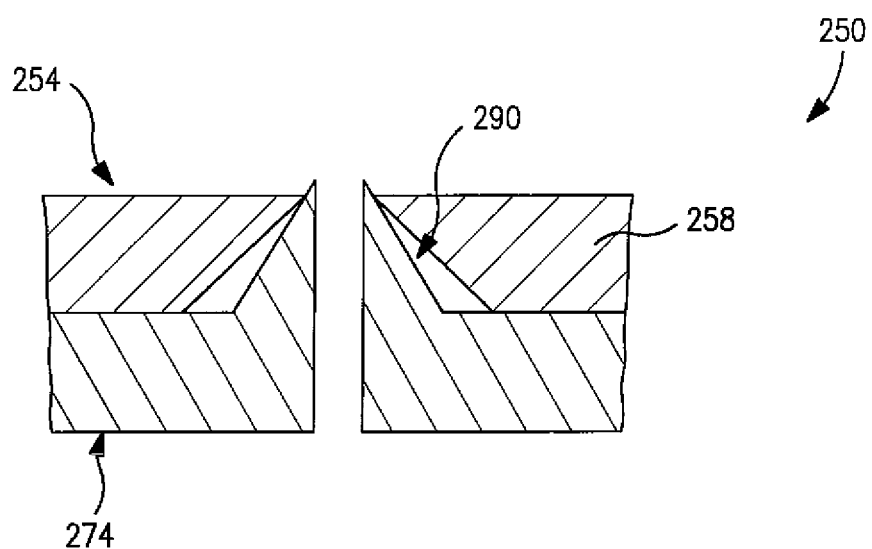
FIG. 7 is a cross-sectional view of another embodiment of the sealing assembly of the present invention.

In certain cases, the tubular member 60 may contain inwardly facing surfaces 63 and 64 that are aligned with the inwardly facing surfaces 71 and 72, respectively, of the body portion 58. The surfaces 63 and/or 64 of the tubular member 60 may be tapered at the same or different angle from each other and/or the surfaces 71 and 72. Typically, however, the surfaces 63 and 64 are tapered at the same angle as the surfaces 71 and 72, respectively, and within the ranges noted above. In this manner, the tapered portion of the frustoconically-shaped orifice 70 can be extended to the edge of the surfaces 63 and 64. Of course, it should be understood that a tubular member is by no means a requirement in the sealing assembly of the present invention. Referring to FIG. 7, for example, another embodiment of a sealing assembly 250 is shown that contains a bushing 254 and a liquid sealing member 274. In this particular embodiment, the sealing assembly 250 lacks a tubular member and the orifice 290 is thus defined only by a body portion 258 of the bushing 254.

Figure 4:
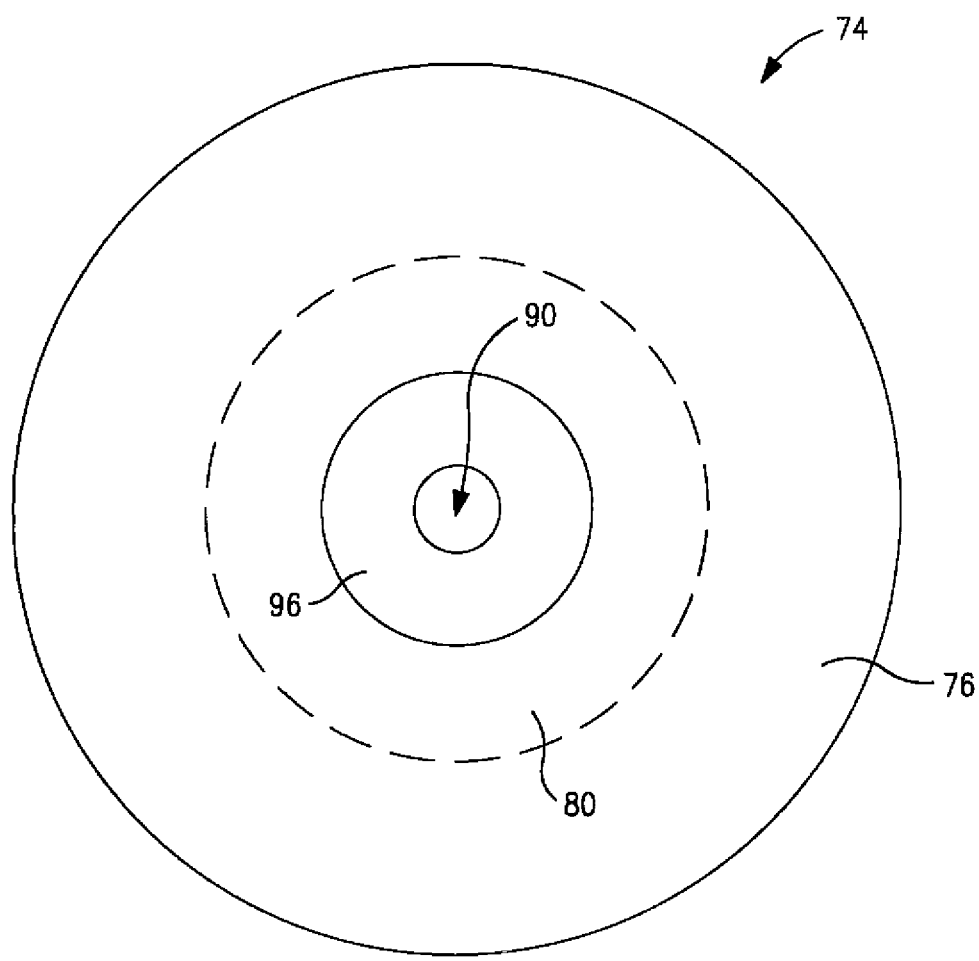
FIG. 4 is a top view of the liquid sealing member of FIG. 2.

Referring again to the embodiment shown in FIGS. 1-5, the sealing assembly 50 also has a sealing member 74, which contains a body portion 80 that defines substantially planar upper and lower surfaces 77 and 79, respectively. A peripheral flange 76 extends outwardly from the body portion 80 in a transverse direction "T" so that the body portion 80 has a width (e.g., diameter) defined between ends 42 that is less than the width of the flange 76. As FIG. 4 illustrates, the body portion 80 and the flange 76 may have a generally circular shape. It should be understood, however, that any geometric configuration may be employed for such components, such as D-shaped, rectangular, triangular, prismatic, etc. Typically, the body portion 80 and/or the peripheral flange 76 are formed from a generally insulative material, such as described above.

A protrusion 96 extends from the body portion 80 of the sealing member 74. As shown, opposing inwardly facing surfaces 91 typically define a third orifice 90 extending through both the protrusion 96 and the body portion 80. The size and shape of the orifice 90 is generally sufficient to accommodate the anode lead. For example, the third orifice 90 may have a maximum width (e.g., diameter) that is smaller than the maximum width of the first orifice 70 and/or the second orifice 62. Typically, the surfaces 91 are also substantially parallel so that the third orifice 90 has a cylindrical shape and a generally constant width.

As described above, the protrusion 96 is of a size and shape such that it can be inserted into the first orifice 70 defined by the bushing 54. For example, the protrusion 96 in the illustrated embodiment has a general frustoconical shape that has a maximum width at its intersection with the body portion 80, which gradually decreases as it extends therefrom. Regardless, the protrusion 96 has opposing outwardly facing surfaces 93 and 94 that define its outer perimeter. The surfaces 93 and/or 94 may be tapered in that they are oriented at angles $\beta_1$ and $\beta_2$, respectively, relative to the transverse direction "T." The angles $\beta_1$ and $\beta_2$ may be the same or different, but are typically greater than the angle of the tapered bushing surface to which they are proximately located (i.e., angles $\alpha_1$ and $\alpha_2$, respectively). For example, the ratio of the angle $\beta_1$ to the angle $\alpha_1$ may be from about 1 to about 5, in some embodiments, from about 1.1 to about 2, and in some embodiments, from about 1.15 to about 1.5. Similarly, the ratio of the angle $\beta_2$ to the angle $\alpha_2$ may be from about 1 to about 5, in some embodiments, from about 1.1 to about 2, and in some embodiments, from about 1.15 to about 1.5. It should be understood, however, that one pair of angles (e.g., $\alpha_1$ and $\beta_1$) may have the relationship described above, while another pair of angles (e.g., $\alpha_2$ and $\beta_2$) may not. For example, the angle $\alpha_2$ may optionally be greater than or equal to the angle $\beta_2$. Regardless, the angles $\beta_1$ and $\beta_2$ are typically within a range of from about 10° to about 80°, in some embodiments from about 20° to about 75°, in some embodiments from about 30° to about 70°, and in some embodiments, from about 45° to about 65°.

Figure 5:
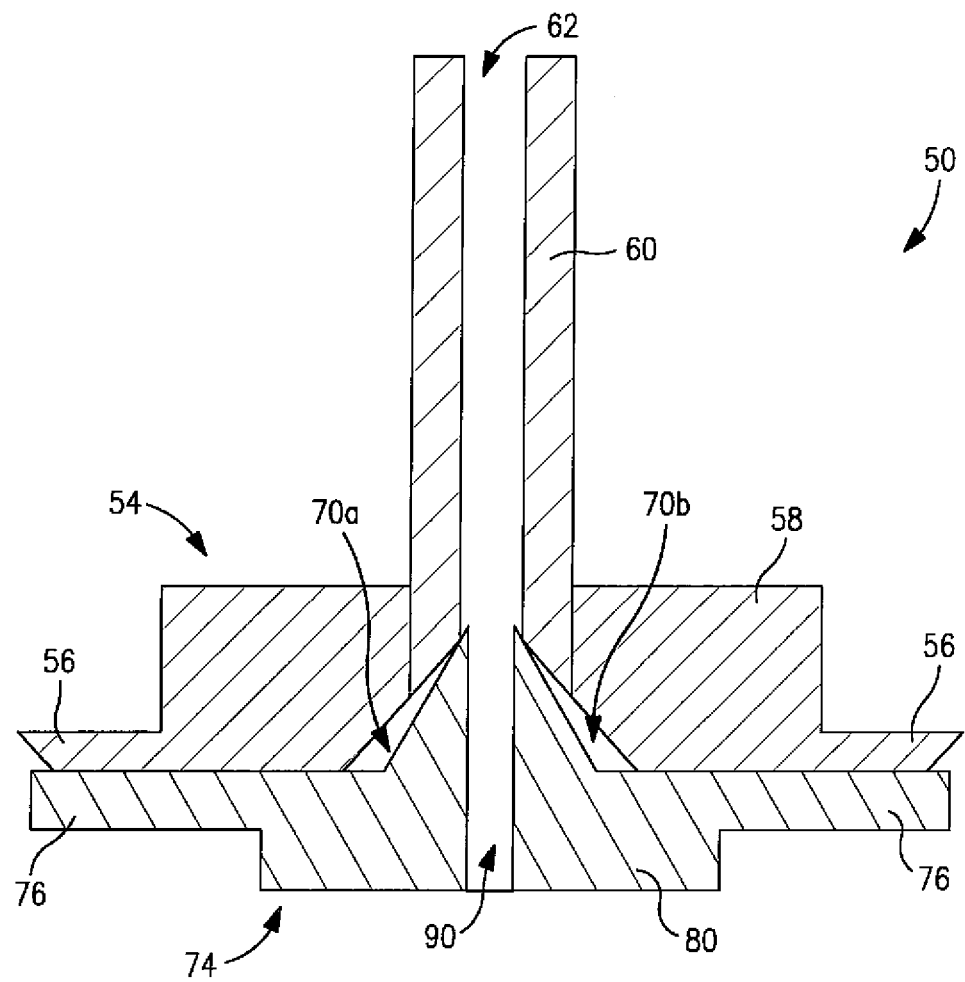
FIG. 5 is a cross-sectional view of one embodiment of the sealing assembly of the present invention that employs the bushing of FIG. 1 and the liquid sealing member of FIG. 2.

FIG. 5 illustrates one particular embodiment of the sealing assembly in its mated configuration. Generally speaking, the liquid sealing member 74 is mated to the bushing 54 by disposing the upper surface 77 of the sealing member 74 adjacent to and substantially flush with the lower surface 57 of the bushing 54. The protrusion 96 is also inserted into the first orifice 70 defined by the bushing 54. Due to tapered nature of the respective surfaces of the protrusion and the bushing, gaps 70a and 70b may be formed between the bushing 54 and the sealing member 74. More particularly, the gap 70a is formed between the surface 71 of the bushing 54 and the surface 93 of the protrusion 96, and the gap 70b is formed between the surface 72 of the bushing 54 and the surface 94 of the protrusion 96. These gaps 70a and 70b can provide a variety of different benefits. For example, if a small amount of fluid happens to flow around the liquid sealing member, it will initially fill the empty space of the gap rather than pressing against the seal between the bushing and the sealing member. This further minimizes the likelihood of a leakage past the seal. Thus, not only can the sealing assembly form a more effective seal, but it can also be designed to accommodate the passage of a small amount of fluid electrolyte around the liquid sealing member without resulting in leakage.

Figure 6:
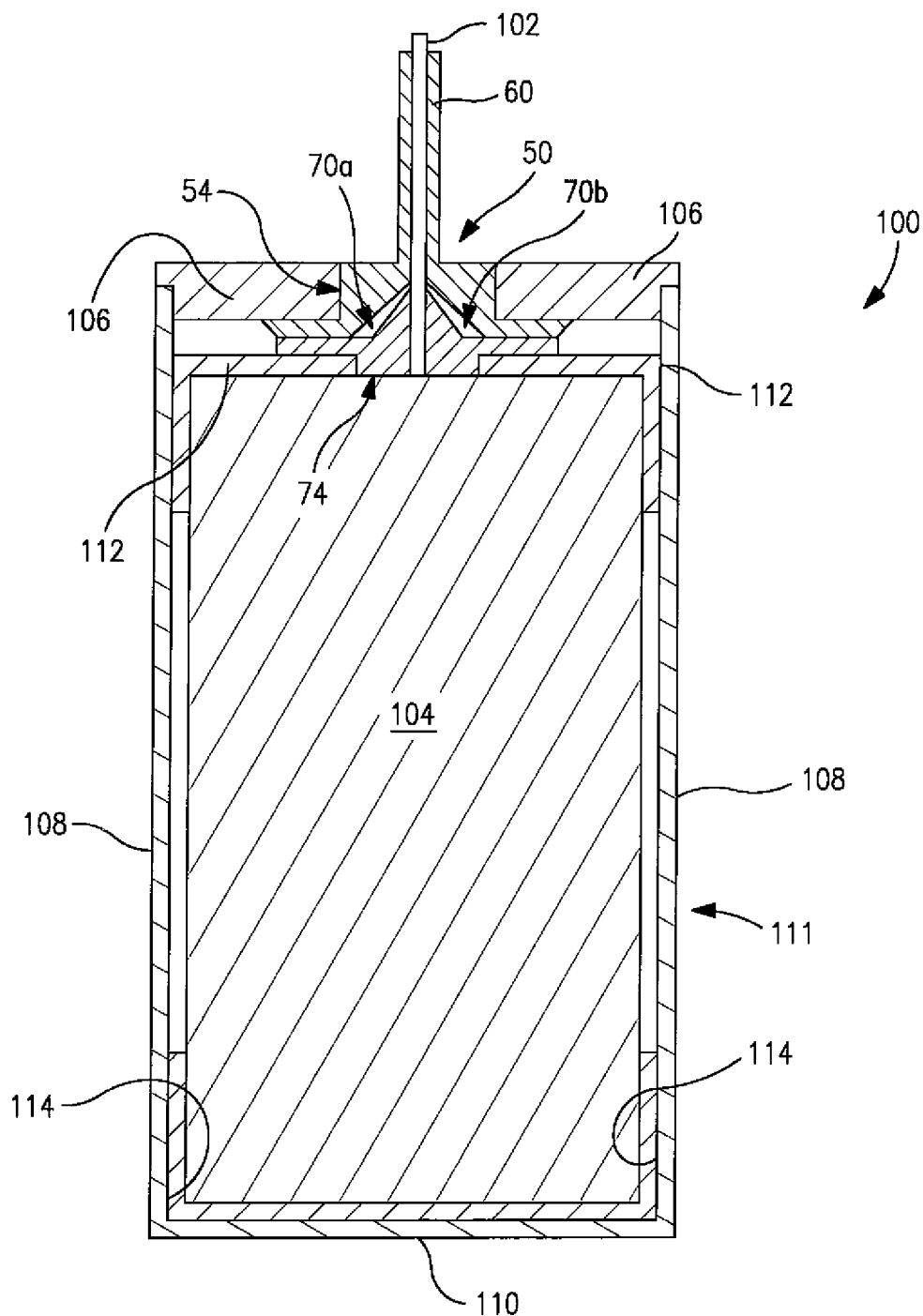
FIG. 6 is cross-sectional view of one embodiment of the wet electrolytic capacitor of the present invention that employs the sealing assembly shown in FIG. 5.

The sealing assembly of the present invention, such as described above, may generally be incorporated into a wet electrolytic capacitor using any of a variety of techniques known in the art. In this regard, FIG. 6 illustrates one particular embodiment of a capacitor 100 in accordance with the present invention.

The capacitor 100 contains an anode 104 that is typically formed from a porous body of a valve metal composition. The specific charge of the composition may vary, such as from about 2,000 $\mu F*V/g$ to about 80,000 $\mu F*V/g$, in some embodiments from about 5,000 $\mu F*V/g$ to about 40,000 $\mu F*V/g$ or more, and in some embodiments, from about 10,000 to about 20,000 $\mu F*V/g$. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. Examples of such valve metal oxides are described in U.S. Pat. Nos. 6,322,912 to Fife; 6,391,275 to Fife et al.; 6,416,730 to Fife et al.; 6,527,937 to Fife; 6,576,099 to Kimmel, et al.; 6,592,740 to Fife, et al.; and 6,639,787 to Kimmel, et al.; and 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

Conventional fabricating procedures may generally be utilized to form the anode 104. In one embodiment, a tantalum or niobium oxide powder having a certain particle size is first selected. The particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 $g/cm^3$, in some embodiments from about 0.2 to about 4.0 $g/cm^3$, and in some embodiments, from about 0.5 to about 3.0 $g/cm^3$.

To facilitate the construction of the anode 104, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), polyvinyl alcohols, naphthalene, vegetable wax, and microwaxes (purified paraffins). The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. If desired, any binder/lubricant may be removed after compression, such as by heating the formed pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes.

The size of the pressed anode 104 may depend in part on the desired size of the metal substrate. In certain embodiments, the length of the anode 104 may range from about 0.5 to about 100 millimeters, in some embodiments from about 1 to about 60 millimeters, and in some embodiments, from about 5 to about 30 millimeters. The width (or diameter) of the anode 104 may also range from about 0.5 to about 50 millimeters, in some embodiments from about 1 to about 40 millimeters, and in some embodiments, from about 4 to about 30 millimeters. The shape of the anode 104 may also be selected to improve the electrical properties of the resulting capacitor. For example, the anode body may have a shape that is cylindrical, rectangular, D-shaped, curved, etc.

The anode 104 may also contain a lead 102 formed from any electrically conductive material, such as tantalum, niobium, nickel, aluminum, hafnium, titanium, etc., as well as oxides and/or nitrides of thereof. In certain embodiments, electrical contact with the anode 104 may be accomplished by electrically coupling the lead 102 by resistance or laser welding. Alternatively, the lead 102 may simply be embedded within the powder before the anode is formed.

The anode 104 is typically anodically oxidized ("anodized") so that a dielectric layer is formed over and/or within the anode. For example, a tantalum (Ta) anode may be anodized to tantalum pentoxide ($Ta_2O_5$). Typically, anodization is performed by initially applying a solution to the anode, such as by dipping anode into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

The fluid electrolyte (not shown) may be impregnated within the anode 104, or it may be added to the capacitor at a later stage of production. The electrolyte is the material that provides the connecting path between the anode and cathode. Various suitable electrolytes are described in U.S. Pat. Nos. 5,369,547 and 6,594,140 to Evans, et al., which are incorporated herein their entirety by reference thereto for all purposes. Typically, the electrolyte is ionically conductive in that has an ionic conductivity of from about 0.5 to about 100 milliSiemens per centimeter ("mS/cm"), in some embodiments from about 1 to about 80 mS/cm, in some embodiments from about 5 mS/cm to about 60 mS/cm, and in some embodiments, from about 10 to about 40 mS/cm, determined at a temperature of 25° C. using any known electric conductivity meter (e.g., Oakton Con Series 11). Within the ranges noted above, it is believed that the ionic conductivity of the electrolyte allows the electric field to extend into the electrolyte to a length (Debye length) sufficient to result in significant charge separation. This extends the potential energy of the dielectric to the electrolyte so that the resulting capacitor is able to store even more potential energy than predicted by the thickness of the dielectric. In other words, the capacitor may be charged to a voltage that exceeds the formation voltage of the dielectric. The ratio of the voltage to which the capacitor can be charged to the formation voltage may, for instance, be from about 1.0 to 2.0, in some embodiments from about 1.1 to about 1.8, and in some embodiments, from about 1.2 to about 1.6. As an example, the voltage to which the capacitor is charged may be from about 200 to about 350 V, in some embodiments from about 220 to about 320 V, and in some embodiments, from about 250 to about 300V.

The fluid electrolyte is generally in the form of a liquid, such as a solution (e.g., aqueous or non-aqueous), dispersion, gel, etc. For example, the electrolyte may be an aqueous solution of an acid (e.g., sulfuric acid, phosphoric acid, or nitric acid), base (e.g., potassium hydroxide), or salt (e.g., ammonium salt, such as a nitrate), as well any other suitable electrolyte known in the art, such as a salt dissolved in an organic solvent (e.g., ammonium salt dissolved in a glycol-based solution). Various other electrolytes are described in U.S. Pat. Nos. 5,369,547 and 6,594,140 to Evans, et al., which are incorporated herein their entirety by reference thereto for all purposes.

The desired ionic conductivity may be achieved by selecting ionic compound(s) (e.g., acids, bases, salts, and so forth) within certain concentration ranges. In one particular embodiment, salts of weak organic acids may be effective in achieving the desired conductivity of the electrolyte. The cation of the salt may include monatomic cations, such as alkali metals (e.g., $Li^+$, $Na^+$, $K^+$, $Rb^+$, or $Cs^+$), alkaline earth metals (e.g., $Be^{2+}$, $Mg^{2+}$, $Ca^{2+}$, $Sr^{2+}$ or $Ba^{2+}$), transition metals (e.g., $Ag^+$, $Fe^{2+}$, $Fe^{3+}$, etc.), as well as polyatomic cations, such as $NH_4^+$. The monovalent ammonium ($NH_4^+$), sodium ($K^+$), and lithium ($Li^+$) are particularly suitable cations for use in the present invention. The organic acid used to form the anion of the salt is "weak" in the sense that it typically has a first acid dissociation constant ($pK_{a1}$) of about 0 to about 11, in some embodiments about 1 to about 10, and in some embodiments, from about 2 to about 10, determined at 25° C. Any suitable weak organic acids may be used in the present invention, such as carboxylic acids, such as acrylic acid, methacrylic acid, malonic acid, succinic acid, salicylic acid, sulfosalicylic acid, adipic acid, maleic acid, mac acid, oleic acid, gallic acid, tartaric acid (e.g., dextotartaric acid, meso-tartaric acid, etc.), citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; blends thereof, and so forth. Polyprotic acids (e.g., diprotic, triprotic, etc.) are particularly desirable for use in forming the salt, such as adipic acid ($pK_{a1}$ of 4.43 and $pK_{a2}$ of 5.41), α-tartaric acid ($pK_{a1}$ of 2.98 and $pK_{a2}$ of 4.34), meso-tartaric acid ($pK_{a1}$ of 3.22 and $pK_{a2}$ of 4.82), oxalic acid ($pK_{a1}$ of 1.23 and $pK_{a2}$ of 4.19), lactic acid ($pK_{a1}$ of 3.13, $pK_{a2}$ of 4.76, and $pK_{a3}$ of 6.40), etc.

While the actual amounts may vary depending on the particular salt employed, its solubility in the solvent(s) used in the electrolyte, and the presence of other components, such weak organic acid salts are typically present in the electrolyte in an amount of from about 0.1 to about 25 wt. %, in some embodiments from about 0.2 to about 20 wt. %, in some embodiments from about 0.3 to about 15 wt. %, and in some embodiments, from about 0.5 to about 5 wt. %.

The electrolyte is typically aqueous in that it contains an aqueous solvent, such as water (e.g., deionized water). For example, water (e.g., deionized water) may constitute from about 20 wt. % to about 95 wt. %, in some embodiments from about 30 wt. % to about 90 wt. %, and in some embodiments, from about 40 wt. % to about 85 wt. % of the electrolyte. A secondary solvent may also be employed to form a solvent mixture. Suitable secondary solvents may include, for instance, glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); alcohols (e.g., methanol, ethanol, n-propanol, iso-propanol, and butanol); ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethylformamide, dimethylacetamide, dimethylcaprylic/capric fatty acid amide and N-alkylpyrrolidones); sulfoxides or sulfones (e.g., dimethyl sulfoxide (DMSO) and sulfoiane); and so forth. Such solvent mixtures typically contain water in an amount from about 40 wt. % to about 80 wt. %, in some embodiments from about 50 wt. % to about 75 wt. %, and in some embodiments, from about 55 wt. % to about 70 wt. % and secondary solvent(s) in an amount from about 20 wt. % to about 60 wt. %, in some embodiments from about 25 wt. % to about 50 wt. %, and in some embodiments, from about 30 wt. % to about 45 wt. %. The secondary solvent(s) may, for example, constitute from about 5 wt. % to about 45 wt. %, in some embodiments from about 10 wt. % to about 40 wt. %, and in some embodiments, from about 15 wt. % to about 35 wt. % of the electrolyte.

If desired, the electrolyte may be relatively neutral and have a pH of from about 4.5 to about 7.0, in some embodiments from about 5.0 to about 6.5, and in some embodiments, from about 5.5 to about 6.0. One or more pH adjusters (e.g., acids, bases, etc.) may be employed to help achieve the desired pH. In one embodiment, an acid is employed to lower the pH to the desired range. Suitable acids include, for instance, inorganic acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. Although the total concentration of pH adjusters may vary, they are typically present in an amount of from about 0.01 wt. % to about 10 wt. %, in some embodiments from about 0.05 wt. % to about 5 wt. %, and in some embodiments, from about 0.1 wt. % to about 2 wt. % of the electrolyte.

The electrolyte may also contain other components that help improve the electrical performance of the capacitor. For instance, a depolarizer may be employed in the electrolyte to help inhibit the evolution of hydrogen gas at the cathode of the electrolytic capacitor, which could otherwise cause the capacitor to bulge and eventually fail. When employed, the depolarizer normally constitutes from about 1 to about 500 parts per million ("ppm"), in some embodiments from about 10 to about 200 ppm, and in some embodiments, from about 20 to about 150 ppm of the electrolyte. Suitable depolarizers may include nitroaromatic compounds, such as 2-nitrophenol, 3-nitrophenol, 4-nitrophenol, 2-nitrobenzonic acid, 3-nitrobenzonic acid, 4-nitrobenzonic acid, 2-nitroace tophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and so forth. Particularly suitable nitroaromatic depolarizers for use in the present invention are nitrobenzoic acids, anhydrides or salts thereof, substituted with one or more alkyl groups (e.g., methyl, ethyl, propyl, butyl, etc). Specific examples of such alkyl-substituted nitrobenzoic compounds include, for instance, 2-methyl-3-nitrobenzoic acid; 2-methyl-6-nitrobenzoic acid; 3-methyl-2-nitrobenzoic acid; 3-methyl-4-nitrobenzoic acid; 3-methyl-6-nitrobenzoic acid; 4-methyl-3-nitrobenzoic acid; anhydrides or salts thereof; and so forth.

Referring again to FIG. 6, separators 112 and/or 114 may also be positioned adjacent to the anode 104 if desired to help prevent direct contact between the anode and cathode, yet permit ionic current flow of the electrolyte to the electrodes. Examples of suitable materials for this purpose include, for instance, porous polymer materials (e.g., polypropylene, polyethylene, polycarbonate, etc.), porous inorganic materials (e.g., fiberglass mats, porous glass paper, etc.), ion exchange resin materials, etc. Particular examples include ionic perfluoronated sulfonic acid polymer membranes (e.g., Nafion™ from the E.I. DuPont de Nemeours & Co.), sulphonated fluorocarbon polymer membranes, polybenzimidazole (FBI) membranes, and polyether ether ketone (PEEK) membranes. Although preventing direct contact between the anode and cathode, the separator permits ionic current flow of the electrolyte to the electrodes.

Regardless, the anode 104 is generally positioned within an interior of a casing 111. The casing 111 is generally formed from a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. In the illustrated embodiment, the casing 111 has a cylindrical shape. It should be understood, however, that any geometric configuration may be employed in the present invention, such as D-shaped, rectangular, triangular, prismatic, etc. If desired, a lid 106 may also be employed that is disposed over the casing 111 and mated with the sealing assembly 50. In the illustrated embodiment, for example, the sealing assembly 50 is simply disposed within an interior annular orifice of the lid 106. Namely, the lid 106 has a lower surface and an end surface that are positioned adjacent to and substantially flush with surfaces 41 and 40, respectively, of the bushing 54 (FIG. 1). Desirably, the casing 111 and the lid 106 are formed from the same materials, such as titanium metals or alloys thereof.

The casing 111 also contains sidewalls 108 and a lower wall 110. Although not shown, a negative lead may optionally be sealed to an end of the lower wall 110. If desired, the sidewalls 108 and/or the lower wall 110 may be roughened to increase surface area. In one embodiment, for example, the surfaces are chemically etched, such as by applying a solution of a corrosive substance (e.g., hydrochloric acid) to the surface. The surfaces may also be electrochemically etched, such as by applying a voltage to a solution of the corrosive substance so that it undergoes electrolysis. The voltage may be raised to a sufficiently high level to initiate "sparking" at the surface of the substrate, which is believed to create high local surface temperatures sufficient that etches away the substrate. This technique is described in more detail in U.S. Patent Application Publication No. 2010/0142124 to Dreissig, et al., which is incorporated herein in its entirety by reference thereto for all purposes. In addition to chemical or electrochemical roughening techniques, mechanical roughening may also be employed. In one embodiment, for instance, the surfaces may be abrasive blasted by propelling a stream of abrasive media (e.g., sand) against at least a portion of a surface thereof.

An electrochemically-active cathode material (not shown) may also be applied to at least a portion of the casing 111 to inhibit corrosion and also act as a heat barrier when voltage is increased. For example, the cathode material may be disposed on the inner surfaces of the sidewalls 108 and/or the lower wall 110. Any of a variety of known electrochemically-active materials may generally be employed. One suitable material is a conductive polymer coating. The conductive polymer coating may be formed from one or more layers. The material employed in such layer(s) may vary. In one embodiment, for example, the material includes conductive polymer(s) that are typically π-conjugated and have electrical conductivity after oxidation or reduction, such as an electrical conductivity of at least about 1 $\mu S\ cm^{-1}$ after oxidation. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth.

Substituted polythiophenes are particularly suitable for use as the electrochemically active material in the present invention. Without intending to be limited by theory, it is believed that charging of the capacitor to a high voltage (e.g., greater than the formation voltage) forces ions of the electrolyte into coatings containing such substituted polythiophenes. This causes the conductive polymer to "swell" and retain the ions near the surface, thereby enhancing charge density. Because the polymer is generally amorphous and non-crystalline, it can also dissipate and/or absorb the heat associated with the high voltage. Upon discharge, it is also believed that the substituted polythiophene "relaxes" and allows ions in the electrolyte to move out of the coating. Through such swelling and relaxation mechanism, charge density near the metal substrate can be increased without a chemical reaction with the electrolyte. Accordingly, mechanical robustness and good electrical performance may be provided without the need for conventional conductive coatings, such as those made from activated carbon or metal oxides (e.g., ruthenium oxide). In fact, excellent results may be achieved using the coating as the principal material on the metal substrate. That is, the coating may constitute at least about 90 wt. %, in some embodiments at least about 92 wt. %, and in some embodiments, at least about 95 wt. % of the material(s) present on the metal substrate. Nevertheless, it should be understood that other conductive coatings may also be used in some embodiments of the present invention.

In one particular embodiment, the substituted polythiophene has the following general structure:

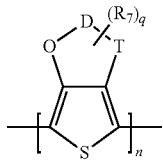

wherein,
T is O or S;
D is an optionally substituted $C_1$ to $C_5$ alkylene radical (e.g., methylene, ethylene, n-propylene, n-butylene, n-pentylene, etc.);
$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_5$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and
q is an integer from 0 to 8, in some embodiments, from 0 to 2, and in one embodiment, 0; and
n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

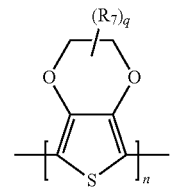

Methods for forming conductive polymers, such as described above, are well known in the art. For instance, U.S. Pat. No. 6,987,663 to Merker, et al., which is incorporated herein in its entirety by reference thereto for all purposes, describes various techniques for forming substituted polythiophenes from a monomeric precursor. The monomeric precursor may, for instance, have the following structure:

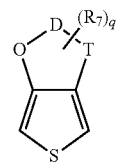

wherein,
T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

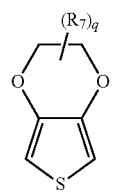

wherein, $R_7$ and q are as defined above. In one particular embodiment, "q" is 0. One commercially suitable example of 3,4-ethylenedioxthiophene is available from Heraeus Clevios under the designation Clevios™ M. Other suitable monomers are also described in U.S. Pat. Nos. 5,111,327 to Blohm, et al. and 6,635,729 to Groenendaal, et al., which are incorporated herein in their entirety by reference thereto for all purposes. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

The thiophene monomers may be chemically polymerized in the presence of an oxidative catalyst. The oxidative catalyst typically includes a transition metal cation, such as iron(III), copper(II), chromium(VI), cerium(IV), manganese(IV), manganese(VII), ruthenium(III) cations, etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst employed in the precursor solution has both a catalytic and doping functionality in that it includes a cation (e.g., transition metal) and anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(II)-p-toluene sultanate is available from Heraeus Clevios under the designation Clevios™ C.

Various methods may be utilized to form a conductive polymer layer. In one embodiment, the oxidative catalyst and monomer are applied, either sequentially or together, such that the polymerization reaction occurs in situ on the substrate. Suitable application techniques may include screen-printing, dipping, electrophoretic coating, and spraying, may be used to form a conductive polymer coating. As an example, the monomer may initially be mixed with the oxidative catalyst to form a precursor solution. Once the mixture is formed, it may be applied to the part and then allowed to polymerize so that the conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The part may then be dried to remove the solvent therefrom. Thereafter, the substrate may be dipped into a solution containing the monomer.

Polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. Nos. 5,457,862 to Sakata, et al., 5,473,503 to Sakata, et al., 5,729,428 to Sakata, et al., and 5,812,367 to Kudoh, et al., which are incorporated herein in their entirety by reference thereto for all purposes.

In addition to in situ application, a conductive polymer layer may also be applied in the form of a dispersion of conductive polymer particles. Although their size may vary, it is typically desired that the particles possess a small diameter to increase the surface area available for adhering to the substrate. For example, the particles may have an average diameter of from about 1 to about 500 nanometers, in some embodiments from about 5 to about 400 nanometers, and in some embodiments, from about 10 to about 300 nanometers. The $D_{90}$ value of the particles (particles having a diameter of less than or equal to the $D_{90}$ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc.

The formation of the conductive polymers into a particulate form may be enhanced by using a separate counterion to counteract the positive charge carried by the substituted polythiophene. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to substituted polythiophenes in a given layer is typically from about 0.5:1 to about 50:1, in some embodiments from about 1:1 to about 30:1, and in some embodiments, from about 2:1 to about 20:1. The weight of the substituted polythiophene referred to in the above-referenced weight ratios refers to the weighed-in portion of the monomers used, assuming that a complete conversion occurs during polymerization.

The dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking. Other components may also be included within the dispersion as is known in the art, such as dispersion agents (e.g., water), surface-active substances, etc.

If desired, one or more of the above-described application steps may be repeated until the desired thickness of the coating is achieved. In some embodiments, only a relatively thin layer of the coating is formed at a time. The total target thickness of the coating may generally vary depending on the desired properties of the capacitor. Typically, the resulting conductive polymer coating has a thickness of from about 0.2 micrometers ("µm") to about 50 µm, in some embodiments from about 0.5 µm to about 20 µm, and in some embodiments, from about 1 µm to about 5 µm. It should be understood that the thickness of the coating is not necessarily the same at all locations on the substrate. Nevertheless, the average thickness of the coating on the substrate generally falls within the ranges noted above.

The conductive polymer layer may optionally be healed. Healing may occur after each application of a conductive polymer layer or may occur after the application of the entire coating. In some embodiments, the conductive polymer can be healed by dipping the part into an electrolyte solution, and thereafter applying a constant voltage to the solution until the current is reduced to a preselected level. If desired, such healing can be accomplished in multiple steps. For example, an electrolyte solution can be a dilute solution of the monomer, the catalyst, and dopant in an alcohol solvent (e.g., ethanol). The coating may also be washed if desired to remove various byproducts, excess reagents, and so forth.

In addition to or in lieu of conductive polymers, metals, such as metal particles formed from ruthenium, iridium, nickel, rhodium, rhenium, cobalt, tungsten, manganese, tantalum, niobium, molybdenum, lead, titanium, platinum, palladium, and osmium, as well as combinations of these metals, may also be employed as the electrochemically active cathode material. In one particular embodiment, for example, the electrochemically-active material includes palladium particles. Non-insulating oxide particles may also be employed in the present invention. Suitable oxides may include a metal selected from the group consisting of ruthenium, iridium, nickel, rhodium, rhenium, cobalt, tungsten, manganese, tantalum, niobium, molybdenum, lead, titanium, platinum, palladium, and osmium, as well as combinations of these metals. Particularly suitable metal oxides include ruthenium dioxide, niobium oxide, niobium dioxide, iridium oxide, and manganese dioxide. Carbonaceous particles may also be employed that have the desired level of conductivity, such as activated carbon, carbon black, graphite, etc. Some suitable forms of activated carbon and techniques for formation thereof are described in U.S. Pat. Nos. 5,726,118 to Ivey, et al.; 5,858,911 to Wellen, et al.; as well as U.S. Patent Application Publication No. 2003/0158342 to Shinozaki, et al., all of which are incorporated herein in their entirety by reference thereto for all purposes.

Apart from the sealing assembly discussed above, the capacitor of the present invention may also contain one or more secondary liquid seals. For example, elastomeric rings (not shown) may be employed as an additional liquid seal. If desired, the rings may be positioned adjacent to the sidewalls 108 of the casing 111 and thereby and help inhibit leakage of the electrolyte therethrough. The elastomeric rings may be formed from an elastomer that is resistant to corrosion by the electrolyte and has sufficient dielectric strength to withstand the maximum voltage generated by the capacitor. In one embodiment, the elastomer can perform over a temperature range of about −55° C. to about 200° C. without degradation or loss of elasticity. Examples of elastomers that may be employed include butyl rubber, chlorobutyl rubber, ethylene propylene rubber (EPR), ethylene propylene diene rubber (EPDM), fluoroelastomers, such as VITON™, polytetrafluoroethylene, polychloroprene rubber, butadiene rubber, nitrile rubber, isoprene rubber, silicone rubber and styrene butadiene rubber.

The resulting capacitor of the present invention may exhibit excellent electrical properties. For example, the capacitor may exhibit a high energy density that enables it suitable for use in high pulse applications. Energy density is generally determined according to the equation $E=1/2*CV^2$, where C is the capacitance in farads (F) and V is the working voltage of capacitor in volts (V). The capacitance may, for instance, be measured using a capacitance meter (e.g., Keithley 3330 Precision LCZ meter with Kelvin Leads, 2 volts bias and 1 volt signal) at operating frequencies of from 10 to 120 Hz and a temperature of 25° C. For example, the capacitor may exhibit an energy density of about 2.0 joules per cubic centimeter ($J/cm^3$) or more, in some embodiments about 3.0 $J/cm^3$, in some embodiments from about 4.0 $J/cm^3$ to about 10.0 $J/cm^3$, and in some embodiments, from about 4.5 to about 8.0 J/cm³. The capacitance may likewise be about 1 milliFarad per square centimeter ("mF/cm²") or more, in some embodiments about 2 mF/cm² or more, in some embodiments from about 5 to about 50 mF/cm², and in some embodiments, from about 8 to about 20 mF/cm².

The equivalent series resistance ("ESR")—the extent that the capacitor acts like a resistor when charging and discharging in an electronic circuit—may also be less than about 15,000 milliohms, in some embodiments less than about 10,000 milliohms, in some embodiments less than about 5,000 milliohms, and in some embodiments, from about 1 to about 1,000 milliohms, measured with a 2-volt bias and 1-volt signal at a frequency of 1000 Hz. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 1 $\mu A/\mu F*V$, in some embodiments less than about 0.5 $\mu A/\mu F*V$, and in some embodiments, less than about 0.1 $\mu A/\mu F*V$, where $\mu A$ is microamps and $\mu F*V$ is the product of the capacitance and the rated voltage. Leakage current may be measured using a leakage test meter (e.g., MC 190 Leakage test, Mantracourt Electronics LTD, UK) at a temperature of 25° C. and at a certain rated voltage after a charging time of from about 60 to about 300 seconds. Such ESR and normalized leakage current values may even be maintained after aging for a substantial amount of time at high temperatures. For example, the values may be maintained for about 100 hours or more, in some embodiments from about 300 hours to about 2500 hours, and in some embodiments, from about 400 hours to about 1500 hours (e.g., 500 hours, 600 hours, 700 hours, 800 hours, 900 hours, 1000 hours, 1100 hours, or 1200 hours) at temperatures ranging from about 100° C. to about 250° C., and, in some embodiments from about 100° C. to about 200° C. (e.g., 100° C., 125° C., 150° C., 175° C., or 200° C.). Likewise, the capacitance may be about 1 milliFarad per square centimeter ("mF/cm²") or more, in some embodiments about 2 mF/cm² or more, in some embodiments from about 5 to about 50 mF/cm², and in some embodiments, from about 8 to about 20 mF/cm².

The electrolytic capacitor of the present invention may be used in various applications, including but not limited to medical devices, such as implantable defibrillators, pacemakers, cardioverters, neural stimulators, drug administering devices, etc.; automotive applications; military applications, such as RADAR systems; consumer electronics, such as radios, televisions, etc.; and so forth.

The present invention may be better understood by reference to the following examples.

Test Methods

All test procedures were measured according to MIL-STD-202G method (Test Conditions D and C). The purpose of this test method is to determine the effectiveness of the seal of a component part that has an internal cavity, which is either evacuated or contains air or gas. A defect in any portion of the surface area of a sealed part can permit entrance of damaging contaminants which will reduce its effective life.

Test Condition D employs a fluorocarbon liquid at 125° C.±5° C. (257° F.±9° F.) at ambient pressure and detects gross leaks by the observation of bubbles. The test pieces, mounted on specified fixtures to hold them in the fluid, is immersed with the uppermost portion at the minimum depth of 2 inches below the surface of the fluid, lid downward, one at a time (or in such a configuration that a single bubble from a single specimen out of a group under observation may be clearly observed as to its occurrence and source). The fluid is maintained at a temperature of 125° C.±5° C. (257° F.±9° F.). The pieces are observed against a dull non-reflective black background through the magnifier from the instant of immersion until 20 seconds after immersion. Leakers are identified by a single bubble or a stream of bubbles. Pieces from which a single bubble is observed is considered to be a reject.

Test Condition C detects fine leaks by using a tracer gas and apparatus to measure a leakage rate to a nominal of 10-8 atm cm³/s. The pieces, which are backfilled and sealed during production with a known percentage of tracer gas, are placed in a chamber connected to the mass-spectrometer-type leak detector, and the chamber evacuated. The internal pressure of the pieces is 1 atmosphere or greater. If a leak exists, the gas passes through the specimen into the chamber and then into the leak detector, which will read the leakage rate.

EXAMPLE 1

Initially, 10 pieces of cylindrical tantalum cans with a size of 18.3 mm (length)×9.1 mm (internal diameter) were sandblasted with a JetStreem Blaster II (SCM System, Inc.). The sandblasting media was black silicon carbide grit having a size of 63 to 106 μm). The media flow rate was 0.5 grams per second via a 3.2-millimeter blasting nozzle. The sandblasting time was 20 seconds. These samples were then degreased in water with surfactants in an ultrasonic bath for 5 minutes, rinsed 3 times in deionized water, and then dried at a temperature of 85° C. for 5 minutes. A precursor solution was thereafter applied to the microroughened surface that contained four (4) parts by weight of ethanol (Sigma-Aldrich, Co.), 0.1 part by weight of methylpyrrolidone (Sigma-Aldrich, Co.), 1 part by weight of 3,4-ethylenedioxythiophene (H.C. Starck GmbH under the designation Clevios™ M), and 10 parts by weight of 40% butanol solution of iron(III)-p-toluene sulfonate (H.C. Starck GmbH under the designation Clevios™ C). The tantalum cans were filled to the control level with the polymerization precursor solution for five (5) minutes. The cans were then drained using a vacuum for up to one (1) minute, and were then put into a drying oven for 15 minutes at 85° C. The resulting structure of poly(3,4-ethylenedioxythiophene) was washed in methanol to remove reaction by-products for five (5) minutes and the tantalum cans were put into a drying oven for five (5) minutes at 85° C. This polymerization cycle was repeated four (4) times. Next, 10 pieces of a cylindrical tantalum anode pressed to a size of 17.3 mm (length)×7.2 mm (diameter) and weight of 4.4 g, and anodized to 10V (the anode exhibited a capacitance of 6.8 mF at a frequency of 120 Hz) were added into previous prepared cans. The electrolyte was a 5.0 M aqueous solution of sulfuric acid (specific gravity of 1.26 g/cm³).

The sealing part of assembly were done using a liquid sealing member. As shown and described herein, the liquid sealing member contained a protrusion having opposing outwardly facing surfaces, at least one of the outwardly facing surfaces being tapered at a second angle that is greater than the first angle (the protrusion was inserted into the orifice). Assembly was done via standard line (i.e., laser welding).

EXAMPLE 2

Capacitors were formed in the manner described in Example 1, except that the liquid sealing members was a gel. The capacitors were tested for leaks in accordance with MIL-STD-202G as described above. The results are set forth below.

|         | % Rejects        |                  |
| ------- | ---------------- | ---------------- |
| Example | Test Condition C | Test Condition D |
| 1       | 5                | 0                |
| 2       | 100              | 100              |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A wet electrolytic capacitor comprising:
   an anode that comprises a porous anode body coated with a dielectric layer;
   a fluid electrolyte that is in electrical contact with the anode, wherein an anode lead extends from the porous anode body;
   a casing within which the anode and the fluid electrolyte are positioned; and
   a sealing assembly that is connected to the casing and through which the anode lead extends, wherein the sealing assembly comprises:
   a bushing that defines a first orifice between opposing inwardly facing surfaces, at least one of the inwardly facing surfaces being tapered at a first angle; and
   a liquid sealing member that is mated with the bushing, the liquid sealing member containing a protrusion having opposing outwardly facing surfaces, at least one of the outwardly facing surfaces being tapered at a second angle, wherein the second angle is greater than the first angle, and wherein the protrusion is inserted into the orifice so that a seal is capable of being formed between the tapered inwardly facing surface of the bushing and the tapered outwardly facing surface of the liquid sealing member.

2. The wet electrolytic capacitor of claim 1, wherein the bushing contains a body portion and a peripheral flange extending therefrom, the body portion defining the first orifice.

3. The wet electrolytic capacitor of claim 1, wherein the first orifice has a frustoconical shape.

4. The wet electrolytic capacitor of claim 1, wherein the sealing assembly further comprises a tubular member located adjacent to the bushing.

5. The wet electrolytic capacitor of claim 4, wherein the tubular member has inwardly facing surfaces that define a second orifice, the anode lead extending into the first orifice and the second orifice.

6. The wet electrolytic capacitor of claim 5, wherein the second orifice has a maximum width that is smaller than the maximum width of the first orifice.

7. The wet electrolytic capacitor of claim 4, wherein the tubular member is formed from a conductive material.

8. The wet electrolytic capacitor of claim 4, wherein the tubular member has inwardly facing surfaces that are aligned with respective inwardly facing surfaces of the bushing.

9. The wet electrolytic capacitor of claim 8, wherein at least one of the inwardly facing surfaces of the tubular member is tapered at an angle substantially equal to the first angle.

10. The wet electrolytic capacitor of claim 1, wherein the liquid sealing member has opposing inwardly facing surfaces that define a third orifice through the protrusion, wherein the anode lead extends into the third orifice and the first orifice.

11. The wet electrolytic capacitor of claim 10, wherein the third orifice has a maximum width that is smaller than the maximum width of the first orifice.

12. The wet electrolytic capacitor of claim 1, wherein the protrusion has a frustoconical shape.

13. The wet electrolytic capacitor of claim 1, wherein the ratio of the second angle to the first angle is from about 1.1 to about 2.

14. The wet electrolytic capacitor of claim 1, wherein the ratio of the second angle to the first angle is from about 1.15 to about 1.5.

15. The wet electrolytic capacitor of claim 1, wherein the first angle is within a range of from about 20° to about 60° and the second angle is within a range of from about 30° to about 70°.

16. The wet electrolytic capacitor of claim 1, wherein the first angle is within a range of from about 35° to about 55° and the second angle is within a range of from about 45° to about 65°.

17. The wet electrolytic capacitor of claim 1, wherein both of the inwardly facing surfaces of the bushing are tapered and both of the outwardly facing surfaces of the liquid sealing member are tapered.

18. The wet electrolytic capacitor of claim 1, wherein a gap is formed between the tapered, inwardly facing surface of the bushing and the tapered, outwardly facing surface of the protrusion.

19. The wet electrolytic capacitor of claim 1, wherein an upper planar surface of the liquid sealing member is disposed adjacent to and substantially flush with a lower planar surface of the bushing.

20. The wet electrolytic capacitor of claim 1, wherein the bushing, the liquid sealing member, or both, are formed from an insulative material.

21. The wet electrolytic capacitor of claim 20, wherein the bushing is formed from a glass material and the liquid sealing member is formed from a polymer material.

22. The wet electrolytic capacitor of claim 1, further comprising a lid that covers the casing, the lid defining a fourth orifice within which the sealing assembly is positioned.

23. The wet electrolytic capacitor of claim 1, wherein the casing contains a sidewall surrounding an interior, wherein an electrochemically active cathode material is located on at least a portion of the sidewall.

24. The wet electrolytic capacitor of claim 23, wherein the electrochemically active cathode material includes a conductive polymer.

25. The wet electrolytic capacitor of claim 24, wherein the conductive polymer is poly(3,4-ethylenedioxythiophene).

26. The wet electrolytic capacitor of claim 1, wherein the casing contains titanium or an alloy thereof.

27. The wet electrolytic capacitor of claim 1, wherein the casing has a generally cylindrical cross-sectional shape.

28. The wet electrolytic capacitor of claim 1, wherein the porous anode body includes tantalum, niobium, or an electrically conductive oxide thereof.

29. The wet electrolytic capacitor of claim 1, wherein the electrolyte is aqueous.

30. The wet electrolytic capacitor of claim 1, further comprising a separator that surrounds at least a portion of the anode.

31. A wet electrolytic capacitor comprising:
a generally cylindrical metal casing that contains a sidewall surrounding an interior, wherein an electrochemically active cathode material is located on at least a portion of the sidewall;
an anode positioned within the interior of the casing, wherein the anode is formed from a porous anode body that contains a dielectric layer, wherein the anode body includes tantalum, niobium, or an electrically conductive oxide thereof, the anode comprising an anode lead extending therefrom;
a fluid electrolyte that is in electrical contact with the anode and the electrochemically active material;
a generally cylindrical lid sealed to the casing and defining an internal orifice;
a sealing assembly that is positioned within the internal orifice of the lid for connection to the casing, wherein the sealing assembly comprises:
a bushing that defines a first orifice between opposing inwardly facing surfaces, at least one of the inwardly facing surfaces being tapered at a first angle;
a tubular member located adjacent to the bushing and having inwardly facing surfaces that define a second orifice; and
a liquid sealing member that is mated with the bushing, the liquid sealing member containing a protrusion having opposing outwardly facing surfaces and opposing inwardly facing surfaces that define a third orifice, the anode lead extending into the first orifice, the second orifice, and the third orifice, and wherein at least one of the outwardly facing surfaces of the protrusion is tapered at a second angle, wherein the second angle is greater than the first angle, and wherein the protrusion is inserted into the first orifice so that a seal is capable of being formed between the tapered inwardly facing surface of the bushing and the tapered outwardly facing surface of the liquid sealing member.

* * * * *